(12) United States Patent
Roeder et al.

(10) Patent No.: US 11,069,251 B1
(45) Date of Patent: Jul. 20, 2021

(54) SYSTEM AND METHOD FOR AUTOMATING THERAPEUTIC EXERCISES BASED ON DISCRETE TRIAL TRAINING

(71) Applicant: ABAL Therapeutics, Inc., Iowa City, IA (US)

(72) Inventors: Shamus Kirkwood Roeder, Iowa City, IA (US); Logan Grote, Iowa City, IA (US)

(*) Notice: Subject to any disclaimer, the term of this patent is extended or adjusted under 35 U.S.C. 154(b) by 477 days.

(21) Appl. No.: 15/967,676

(22) Filed: May 1, 2018

Related U.S. Application Data

(60) Provisional application No. 62/602,910, filed on May 11, 2017.

(51) Int. Cl.
| | | |
|---|---|---|
| *G09B 5/06* | (2006.01) | |
| *G09B 19/00* | (2006.01) | |
| *G09B 5/14* | (2006.01) | |
| *H04L 29/08* | (2006.01) | |

(52) U.S. Cl.
CPC ............ *G09B 5/065* (2013.01); *G09B 5/14* (2013.01); *G09B 19/00* (2013.01); *H04L 67/12* (2013.01)

(58) Field of Classification Search
CPC .......... G09B 5/065; G09B 5/14; G09B 19/00; H04L 67/12
USPC ....................................................... 434/236
See application file for complete search history.

(56) References Cited

U.S. PATENT DOCUMENTS

| | | | |
|---|---|---|---|
| 6,537,073 B2 | 3/2003 | Zhang | |
| 6,905,883 B1 | 6/2005 | Olmstead | |
| 8,812,588 B2 | 8/2014 | Dutton et al. | |
| 2011/0275483 A1* | 11/2011 | Dugan ................ | A63F 13/92 482/8 |
| 2015/0099946 A1 | 4/2015 | Sahin | |
| 2015/0151198 A1* | 6/2015 | Dugan ................ | A63F 13/31 463/29 |

OTHER PUBLICATIONS

Smith, Tristram; Discrete Trial Training in the Treatment of Autism; Focus on Autism and Other Developmental Disabilities; May 2001; pp. 86-92; vol. 16, No. 2.

* cited by examiner

*Primary Examiner* — Robert P Bullington
(74) *Attorney, Agent, or Firm* — Shuttleworth & Ingersoll, PLC; Jason R. Sytsma

(57) ABSTRACT

Remote administration of discrete trial training exercises to a patient and analyzing results. Instructions are executed by the processing circuitry of the patient-side device that interrupts the operation of the entertainment circuitry to administer the discrete trial training exercise to the patient. Sensor data from at least one input capture element is collected. The sensor data is analyzed and compared to a pre-determined result and if the sensor data substantially matches the pre-determined result, a reward command is sent to the patient-side device that causes a resumption of the operation of the entertainment circuitry on the patient-side device.

15 Claims, 5 Drawing Sheets

SYSTEM AND METHOD FOR AUTOMATING THERAPEUTIC EXERCISES BASED ON DISCRETE TRIAL TRAINING

CROSS-REFERENCE TO RELATED APPLICATIONS

The present application claims the benefit of provisional patent application 62/602,910 filed May 11, 2017, which is incorporated herein by reference.

TECHNICAL FIELD

This disclosure relates to autism treatment, and more specifically, to a system for remote administration of discrete trial training exercises to a patient and analyzing results.

BACKGROUND INFORMATION

Autism, or autism spectrum disorder (ASD), refers to a range of conditions characterized by challenges with social skills, repetitive behaviors, speech and nonverbal communication, as well as by unique strengths and differences. We now know that there is not one autism but many types, caused by different combinations of genetic and environmental influences. The term "spectrum" reflects the wide variation in challenges and strengths possessed by each person with autism.

Autism probably begins in utero but its most-obvious signs tend to appear between 2 and 3 years of age. In some cases, it can be diagnosed as early as 18 months. Scientific studies have demonstrated that early intensive behavioral intervention improves learning, communication and social skills in young children with autism. While the outcomes of early intervention vary, all children benefit. Researchers have developed a number of effective early intervention models.

One such method that is believed to be helpful is teaching in simplified steps. The Discrete Trial Training (DTT) is a method of teaching in simplified and structured steps. Instead of teaching an entire skill in one go, the skill is broken down and built-up using discrete trials that teach each step one at a time. DTT is also referred to in literature as "discrete trial procedure," "discrete trial teaching," or "discrete trial instruction." One of its most common uses is in early interventional treatment for individuals with autism spectrum disorder or similar developmental disorders. For children with autism, DTT is especially useful for teaching new forms of behavior (e.g., speech sounds or motor movements that the child previously could not make) and new discriminations (e.g., responding correctly to different requests). DTT can also be used to teach more advanced skills and manage disruptive behavior.

While therapists have been using DTT-based exercises to treat ASD, the therapy thus far has been limited to the therapy sessions. Accordingly, there is a need for a system and method for extending DTT-based exercises outside therapy sessions into the patients' everyday life, which can be used by therapists or by parents in their own home.

SUMMARY

In accordance with one aspect of the present invention, a system for remote administration of discrete trial training exercises to a patient and analyzing results is provided. The system comprises a patient-side device comprising entertainment circuitry, processing circuitry, at least one input capture element in communication with the processing circuitry, and a non-transitory computer readable medium having instructions stored thereon, and remote network communication circuitry for communicating with a therapist-side device comprising processing circuitry, remote network communication circuitry, and a non-transitory computer readable medium having instructions stored thereon. When the instructions are executed by the processing circuitry of the patient-side device the circuitry interrupts the operation of the entertainment circuitry to administer the discrete trial training exercise to the patient. Sensor data from at least one input capture element is collected. The sensor data includes one chosen from image data, audio data, and motion data. The sensor data is analyzed and compared to a pre-determined result and if the sensor data substantially matches the pre-determined result, a reward command is sent to the patient-side device that causes a resumption of the operation of the entertainment circuitry on the patient-side device. The system can include instructions when executed by the processing circuitry of the patient-side device that cause the processing circuitry to provide instructional commands that relate to the administration of the discrete trial training exercise to the patient.

The system can further comprise the therapist-side device. In such an implementation, the sensor data can be transmitted to the therapist-side device. The instructions when executed by the processing circuitry of the therapist-side device can cause the processing circuitry to analyze the sensor data and compare the sensor data to a pre-determined result and if the sensor data substantially matches the pre-determined result to send via the remote network communication circuitry the reward command to the patient-side device that causes a resumption of the operation of the entertainment circuitry on the patient-side device. Conversely, if the sensor data does not substantially match the pre-determined result, a consequence command can be sent that causes the resumption of the operation of the entertainment circuitry on the patient-side device after a pre-determined delay.

In various implementations, the patient-side device can comprise a mobile device, and the entertainment circuitry can comprise speakers for providing audio information and a display for providing visual information. Furthermore, the input capture elements comprise one or more chosen from a microphone, a camera, a gyroscope, and an accelerometer.

In another implementation a method for remote administration of discrete trial training exercises to a patient and analyzing results is disclosed. The method can comprise providing to the patient a patient-side device comprising entertainment circuitry, processing circuitry, remote network communication circuitry, and a non-transitory computer readable medium having instructions stored thereon, and at least one input capture elements in communication with the processing circuitry. The method continues by interrupting operation of the entertainment circuitry to administer the discrete trial training exercise to the patient and collecting via the at least one input capture elements sensor data which includes one chosen from image data, audio data, and motion data. The method further continues with analyzing the sensor data and comparing the sensor data to a pre-determined result. Then, determining whether the sensor data substantially matches the pre-determined result. Upon a determination that the sensor data substantially matches the pre-determined result, rewarding the patient by causing a resumption of the operation of the entertainment circuitry on the patient-side device. Conversely, upon a determination that the sensor data does not substantially match the predetermined result, delaying for a pre-determined amount of time the resumption of the operation of the entertainment circuitry on the patient-side data.

In such a method, a therapist-side device comprising processing circuitry, remote network communication circuitry, and a non-transitory computer readable medium having instructions stored thereon; transmitting via the remote network communication circuitry a sensor data collected from the at least one sensor to the therapist-side device can be provided. This implementation continues with analyzing the sensor data and comparing the sensor data to a pre-determined result on the therapist-side device. The method can further continue by sending via the remote network communication circuitry a plurality of discrete trial training exercises to the patient-side data collection device from the therapist-side device from which the processing circuitry on the patient-side device selects one discrete trial training exercise from the plurality of discrete trial training exercises, and providing instructional commands to the patient-side device that relate to the administration of the discrete trial training exercise to the patient.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
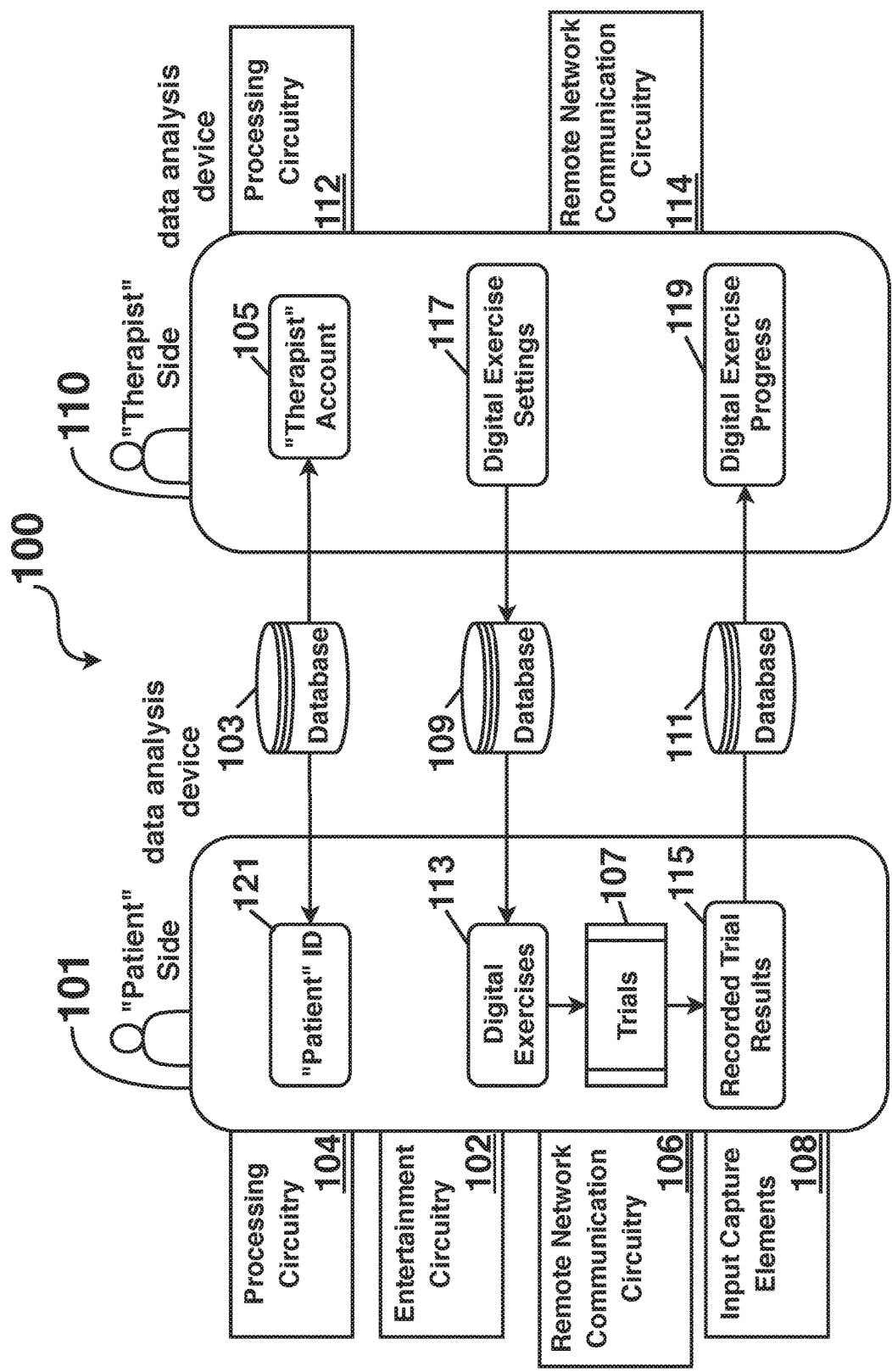
FIG. 1 is a block diagram of a sample environment for providing remote administration of discrete trial training exercises to a patient with a patient-side data collection device and analyzing the results with a therapist-side data collection device.

FIG. 1 shows an environment for providing remote administration of discrete trial training (DTT) exercises to a patient with a patient-side device 101 and analyzing the results with a therapist-side device 110. Before going into detail, it is important to describe DTT as used herein. Individual exercises in DTT are characterized by five clearly defined steps. The first step is the "Antecedent." The Antecedent sets up the response, so, for example, in the case of a DTT exercise concerning eye contact; this could be the administerer of the exercise looking at the recipient, saying the recipient's name, verbally instructing them to look at the administerer of the exercise.

The second step is the "Prompt." The prompt is a supplemental teaching aid that is introduced in order to assist the patient with the completion of the exercise. Continuing with the eye contact example, this could be additional verbal instructions, such as the administerer placing a sticker on his/her face to attract the recipient's gaze, or the administerer physically moving the recipient's head to make eye contact.

The third step is the "Response." The response (also referred to as the "target behavior" or "behavior"), is a clearly defined response from the recipient that is the goal of the exercise. The response must be very clearly detailed beforehand so that it is clear what behavior is to be reinforced. Continuing with the eye contact example, the recipient makes eye contact with the administerer and maintains it for 5 continuous seconds.

The fourth step is the "Consequence." For the consequence, the administerer provides an indication of success or failure to the recipient based on whether or not their behavior aligned with the desired response, from step 3. Success is frequently accompanied by a reward given by the administerer. In eye contact example, a consequence for a correct response might entail a small piece of chocolate being given to the recipient while a consequence for an incorrect response might entail the administerer saying "No."

The final step is the "Inter-Trial Interval." The inter-trial interval marks the end of the individual trial and is typically associated with a brief pause. Some programs have very well defined time lengths and others have interval lengths defined by however long it takes the consequence (from step 4 above) to be completed. This time is nearly universally used to record information about the trial that may include, but is not limited to, correct or incorrect response, prompts required, time taken to complete the trial, or any unusual behavior by the recipient. In the eye contact example, the administerer of the exercise may wait 20 seconds before beginning the next trial.

At a high level, FIG. 1 shows a system 100 for remote administration of discrete trial training exercises to a patient and analyzing the results. In this regard, system 100 introduces DTT exercises to the day-to-day use of electronic devices by the "patient" with minimal additional investment of time or resources by the "therapist", and leveraging the resumption of usage of the electronic device as a reward for success in said DTT-based exercises.

With respect to the steps of the DTT methodology, the Antecedent is the interruption of the recreational use of the electronic device with the appearance of the DTT exercise. The Prompt is set by the "therapist" and is presented under conditions set by the "therapist". The Response is set by the "therapist" and is measured by the sensors either built into the "patient's" electronic device or by sensors in an attached peripheral. The Consequence of success is that the "patient" is allowed to immediately return to their previous activity, and the Consequence of failure is that the "patient" is delayed in returning to their previous activity. The Inter-Trial Interval is set by the "therapist" and can be based on a variety of parameters including, but not exclusive to, time, number of exercises conducted in a given period of time, or the applications or activities being used by the "patient".

System 100 comprises of a patient-side device 101 and a therapist-side device 110. Patient-side device 101 can comprise a table, a smartphone, any type of mobile device or desktop used by an intended recipient of the DTT exercises (i.e., a patient). Therapist-side device 110 can comprise of any type of computing device (e.g., mobile device, desktop, or combination of the two) that allows the therapist to remotely select and set the DTT exercises to be carried out on patient-side device 101 and to customize aspects of the selected DTT exercise(s) including, but not limited to, the "unlock conditions", prompts for the exercise, images used in exercises reliant on visuals, the time between exercises, or the time until the patient's entertainment circuitry 102 unlocks without an "unlock condition" being satisfied.

More specifically, patient-side device 101 comprises instructions when executed by the processing circuitry of patient-side device 101 cause the processing circuitry to interrupt operation of the entertainment circuitry to administer the DTT exercise to the patient. The idea is that when the DTT exercise is presented to the patient on patient-side device 101, the patient cannot return to their previous activity on patient-side device 101 until an "unlock condition" is satisfied. Such an unlock condition can include, but is not limited to, a successful completion of the DTT exercise, a pre-determined amount of time elapsing, a password or passcode being entered, another appropriate pre-determined input from an input capture element 108 (discussed below) being provided, or an appropriate unlock command sent from another device to patient-side device 101.

Patient-side device 101 further comprises of an entertainment circuitry 102 comprising speakers to provide audio and a display to provide visual information to the user (for example, videos, music, movies, games, etc.), processing circuitry 104, and at least one input capture element 108 (described below).

During administration of the DTT exercise on patient-side device 101, data relevant to the DTT exercise being performed is recorded from at least one input capture element 108, which for example can be one or more sensors either built into patient-side device 101 or added via I/O ports, such input capture element(s) 108, include, but are not limited to, mouse, keyboard, buttons, touchscreens, microphone, camera, gyroscope, accelerometer, etc.

With respect to therapist-side device 110, therapist-side device 110 comprises instructions that allow the "therapist" to remotely select and set the DTT exercises to be carried out on patient-side device 101 and to customize aspects of the selected DTT exercise(s) including, but not limited to, the "unlock conditions", prompts for the exercise, images used in exercises reliant on visuals, the time between exercises, or the time until the patient's entertainment circuitry 102 unlocks without an "unlock condition" being satisfied. Therapist-side device 110 will also allow the therapist to view the data retrieved from patient-side device 101 and to interact with one or more patients, as detailed above. Therapist-side device 110 also comprises of a processing circuitry 112 and a remote network communication circuitry 114.

Therapist-side device 110 sends via remote network communication circuitry 114 the DTT exercise to patient-side device 101. At the appropriate time, the Antecedent is initiated, which is defined by instructions for carrying out the DTT exercise. These instructions are executed by processing circuitry 104 of patient-side device 101 to cause processing circuitry 104 to interrupt operation of entertainment circuitry 102 to administer the DTT exercise to the patient on patient-side device 101. An exemplary DTT test might be an image of the therapist appearing on the screen of the patient-side. Instructions for the Prompt might for example cause an audible instruction to the patient to look at the therapist's eyes on the screen.

The instructions executed by processing circuitry 104 collect via the at least one input capture element(s) 108 sensor data which includes one chosen from image data, audio data, and motion data. Continuing with this example, a camera on patient-side device 101 may record the actions of the patient in response to the Prompt to look at the therapist's eyes on the screen. This sensor data can either be analyzed on the patient-side device or transmitted via remote network communication circuitry 106 to therapist-side device 110 for analysis. In either case, instructions when executed by processing circuitry 104 on patient side device or processing circuitry 112 on therapist-side device 110 cause either processing circuitry 104 or processing circuitry 112 to analyze the sensor data and compare the sensor data to a pre-determined result to determine the Consequence. If the sensor data substantially matches the pre-determined result, a reward command causes the resumption of the operation of entertainment circuitry 102 on patient-side device 101. If the sensor data does not match the pre-determined result, a consequence command, for example, a predetermined delay that causes the resumption of the operation of entertainment circuitry 102 on patient-side device 101 after a pre-determined delay. Instructions in the DTT exercises may also have defined the Inter-Trial Interval, which, as previously stated, can be based on a variety of parameters including, but not exclusive to, time, number of exercises conducted in a given period of time, or the applications or activities being used by the "patient" to determine when the next Antecedent will be given.

Continuing on with FIG. 1, system 100 can also comprise one or more database(s) 103, 109, 111 through which data is stored and/or transferred. This data, can, for example, be the sensor data, the DTT exercises, etc. In one implementation, patient-side device 101 is linked to therapist-side device 110 via unique identifiers 121 assigned to the individual patient-users that are connected to the individual therapist's accounts 105 that are assigned to the individual therapist-users. These relationships can be stored on database 103. On therapist-side device 110, the therapist can alter a variety of DTT Exercise Settings 117 stored thereon. These alterations can be sent to a database 109 to be stored and relayed to the patient-side device 101 to be reflected in how DTT exercises 113 (which comprise instructions that are carried out by processing circuitry 104) are administered to the patient in the course of a DTT trial 107 (which comprise instructions that are carried out by processing circuitry 104). The recorded trial results 115 (which comprise sensor data) are sent to a database 111 or sent to the therapist-side device 110 to be made viewable to the therapist in context to previous recorded trial results as Digital Exercise Progress 119 stored on therapist-side device 110.

Figure 2:
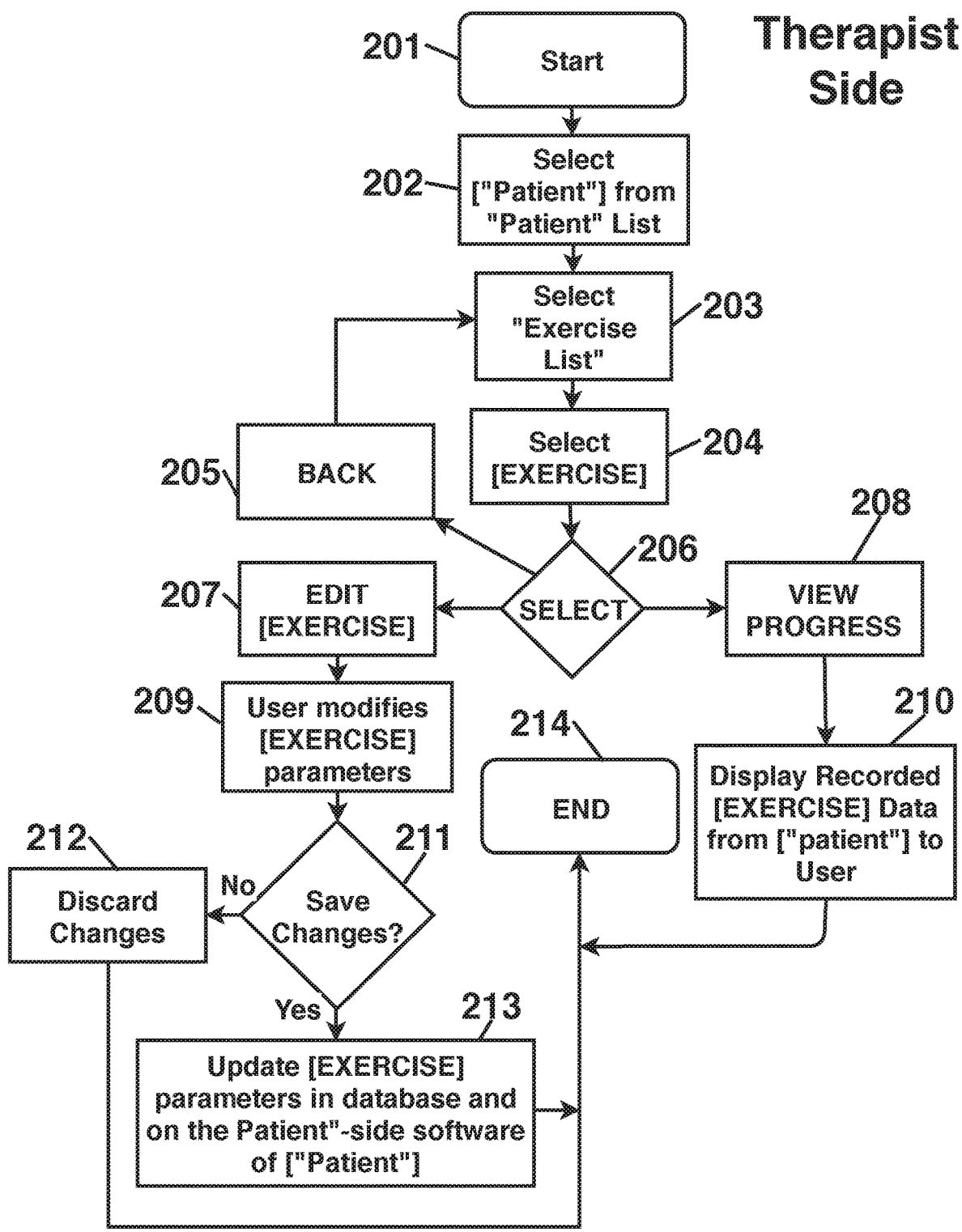
FIG. 2 is a flow chart of the organization and analysis of the discrete trial training exercises performed by the patient on the therapist-side data collection device.

FIG. 2 shows a flow chart of the administration of DTT exercises on the patient-side device 101. The method begins at step 201 with the therapist interacting with a user interface on the therapist-side device 110. The therapist can select a particular patient from a potential assortment of from a list of patients at step 202. The therapist can select the option to view a list of DTT exercises at step 203, which are pertinent to the particular patient. From this list of DTT exercises, the therapist can select a particular DTT exercises at step 204. Optionally, the therapist can make a decision at step 206 to navigate back to the previous windows, screens, or interfaces at step 205. This list of DTT exercises should allow the user to edit the selection at step 207 or view the progress of the patient or multiple exercises at step 208. Should the therapist decide to view the progress at step 208, relevant data, both cumulative and otherwise, to the exercise gathered by patient-side device 101 is presented graphically, numerically, or textually to the therapist at step 210. At this point, the therapist's interaction with therapist side device 110 as it relates to the administration of DTT-based exercises can come to an end at step 214.

Should, however, the therapist select to edit the exercise at step 207 after having selected the particular DTT exercise at step 204, the therapist can select from a number of parameters that are specific to the particular patient at step 209. In this step 209, the therapist can select parameter specific to the exercise(s). Relevant parameters can include, but are not limited to, what word the patient is supposed to say in a vocalization exercise, colors that the patient is supposed to identify in a color exercise, the time limit for the completion of a given exercise, the number of a particular exercise to be performed in a given length of time, an uploaded image intended to be used as a visual aid in a given exercise, or an audio file to be used as a consequence for a correct or incorrect response.

Upon completion of the modifications to the exercise parameters at step 209, the therapist can chose at step 211 to discard the parameters at step 212 or save changes to the parameters at step 213. Should the therapist choose at step 211 to save changes at step 213, the modifications that the therapist made at step 209 will be stored on database 109 and will be reflected on patient-side device 101 for which this exercise(s) selected at step 204 pertains. At this point, the therapist's interaction with therapist-side device 110 so far as it relates to the administration of DTT-based exercises could optionally come to an end at step 214.

Figure 3:
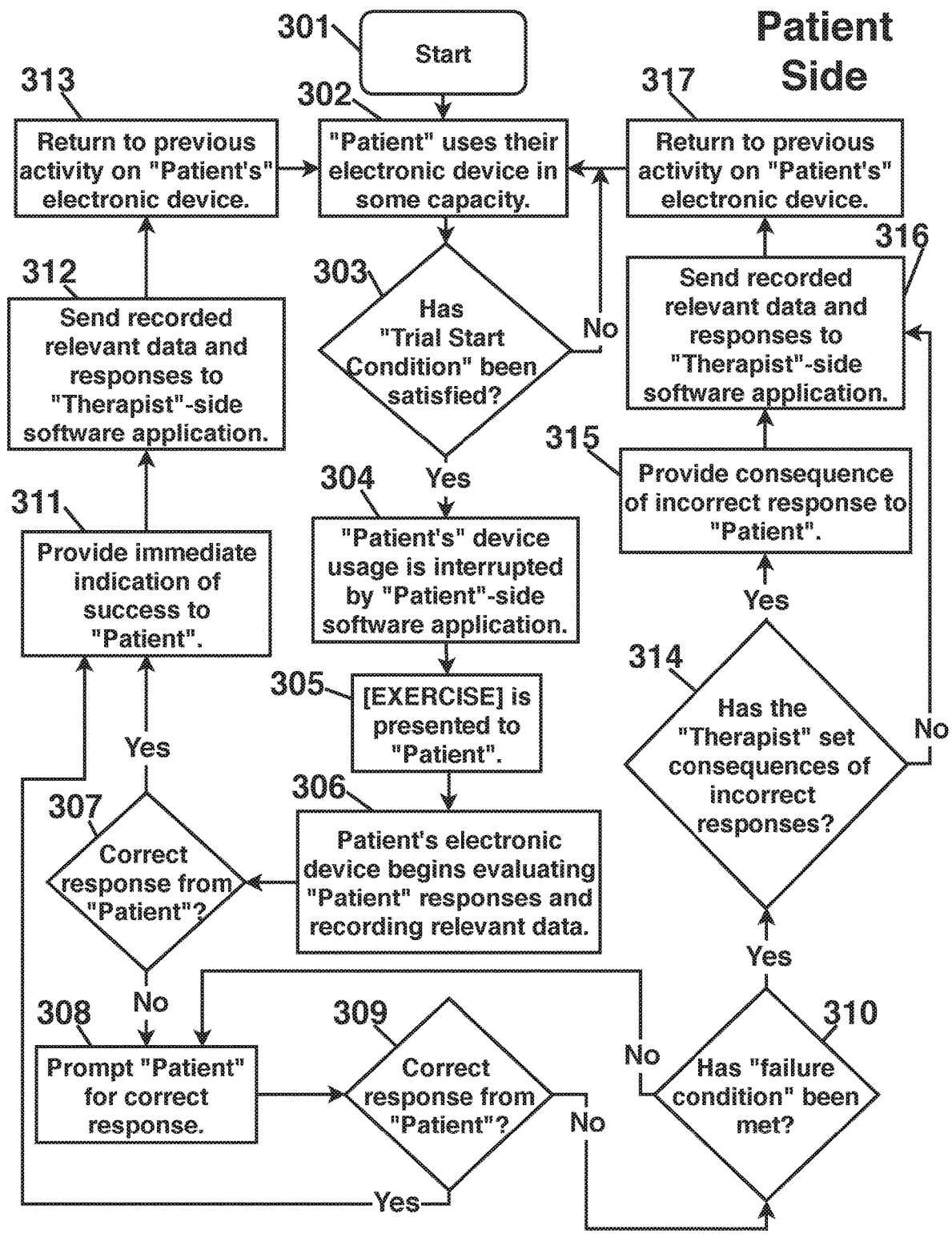
FIG. 3 is a flow chart of the administration of discrete trial training exercises on the patient-side data collection device.

Turning to FIG. 3, a flow chart of the organization and analysis of the discrete trial training exercises performed by the patient on the therapist-side data collection device is shown. System 100 assumes that patient-side device 101 is being used in some capacity by the patient so that entertainment circuitry 102 can be interrupted to carry out the DTT exercises. The method begins at step 301 and at step 303 the "Trial Start Condition" has been satisfied by use of the patient-side device 101 by the patient. This "Trial Start Condition" can be adjusted by the therapist via the therapist-side device 110. The interruption of the patient's usage of the patient-side device 101 is followed by the presentation of an exercise to the patient at step 305 in accordance with the exercise selection and settings defined by the therapist via therapist-side device 110, as previously discussed.

Patient-side device 101 will record with the input capture elements 108 relevant sensor data at step 306 for the purpose of data collection at step 312 and at step 316 and compare the sensor data with a pre-determined, desired response at step 307 and step 309 in accordance with the exercise selection and settings defined by the therapist via therapist-side device 110. The means by which the responses and relevant data are evaluated and recorded at step 306 are dependent on the exercise being administered at step 305. For example, in the case of an exercise regarding vocalization by the patient, input capture element 108 in the form of a microphone, either built into patient-side device 101 or attached via external peripheral, can record the sounds being made by the patient and evaluated based on its similarity to the desired responses. In the course of evaluating the patient's responses at step 306, should the initial response from the patient be evaluated at step 306 to be incorrect, a decision is made at step 307, the patient can then be presented with a prompt to obtain the correct response at step 308 in accordance with the exercise selection and settings defined by the therapist via therapist-side device 110. Should the patient not provide the correct response again, at step 310 a "failure condition", that was defined in accordance with the exercise selection and settings defined by the therapist has been met. The patient will be presented with a consequence of incorrect response at step 315 under the condition that the therapist set for incorrect responses at step 314.

Following the consequence of incorrect response being presented to the patient at step 315 or following the "failure condition" being met at step 310, the recorded relevant sensor data and responses will be sent to therapist-side device 110 via an intermediary database 111 or directly via network to therapist-side device 110. The patient can then be permitted to return to the previous activity on patient-side device 101. Alternatively, if the patient's response has been evaluated to be correction, the patient can be provided with an indication of success at step 311 and the recorded relevant sensor data and responses will be sent to therapist-side device 110 via an intermediary database 111 or directly via network. The patient will then be able to return to the previous activity on patient-side device 101 at step 313, which was originally interrupted. In either case of the patient completing a trial successfully or unsuccessfully, the patient can resume the interrupted activity, unless the consequence of incorrect response at step 315 set by the therapist at step 313 interferes with or otherwise prevents the return to previous activity until the "Trial Condition" has again been satisfied step 303.

Figure 4:
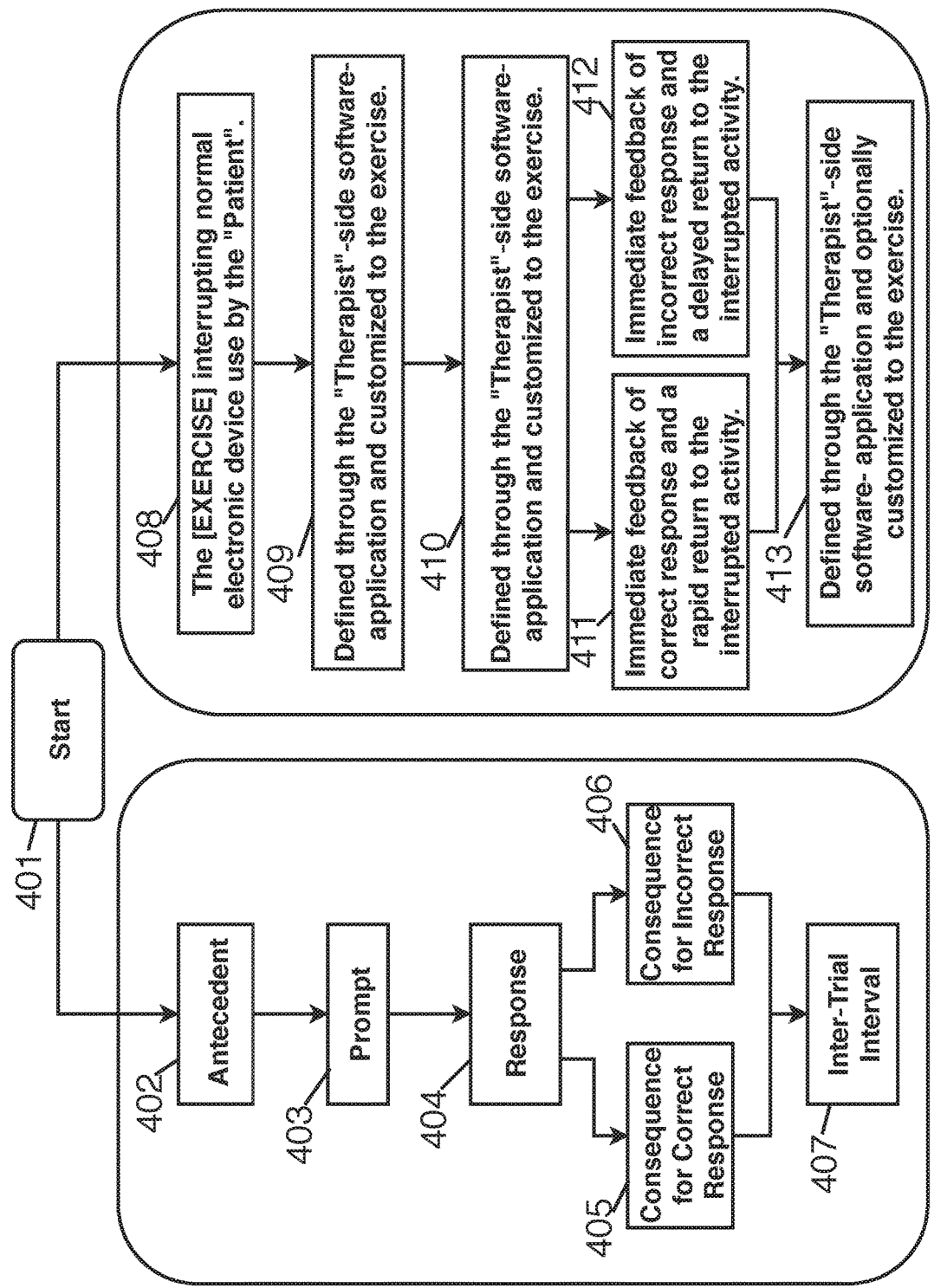
FIG. 4. is a flow chart of the possible discrete trial training exercises and how they are analyzed.

Turning to FIG. 4, a flow chart of the possible DTT exercises and how they are analyzed is shown. The left side of FIG. 4 shows the standard DTT methodology and the right side shows the method by which by the therapist can automate exercises based upon discrete trial training via a system 100. When an exercise based upon DTT is administered at step 401, the Antecedent comes first at step 402, which can be represented as an interruption to normal activity on the patient's electronic device which when implemented with the instructions herein described is patient-side device 101. The patient's patient-side device 101 is interrupted at step 408. The Antecedent at step 402 is then followed by a Prompt at step 403 which is customized to the individual exercise by the therapist at step 409. The Prompt at step 403 is followed by the Response at step 404, which is the desired behavior, action, or response to be performed by the patient. The Response at step 404 can be defined by the therapist on the therapist-side device and customized to the individual exercise at step 410.

In the context of traditional DTT-based exercises, the event of the recipient of DTT-based exercises giving a correct response, the Consequence for Correct Response is administered at step 405. The Consequence for Correct Response at step 404, can be a rapid return to the interrupted activity at step 411. In the context of traditional DTT-based exercises, the event of the recipient of DTT-based exercises giving an incorrect response, the Consequence for Incorrect Response is administered at step 406. The Consequence can be a delayed return to the interrupted activity at step 412. Upon the conclusion of the trial, the Inter-Trial Interval at step 407 defines the delay between the end of one trial and the beginning of the next trial. The Inter-Trial Interval at step 407, is optionally customized to the individual exercise at step 413.

Figure 5:
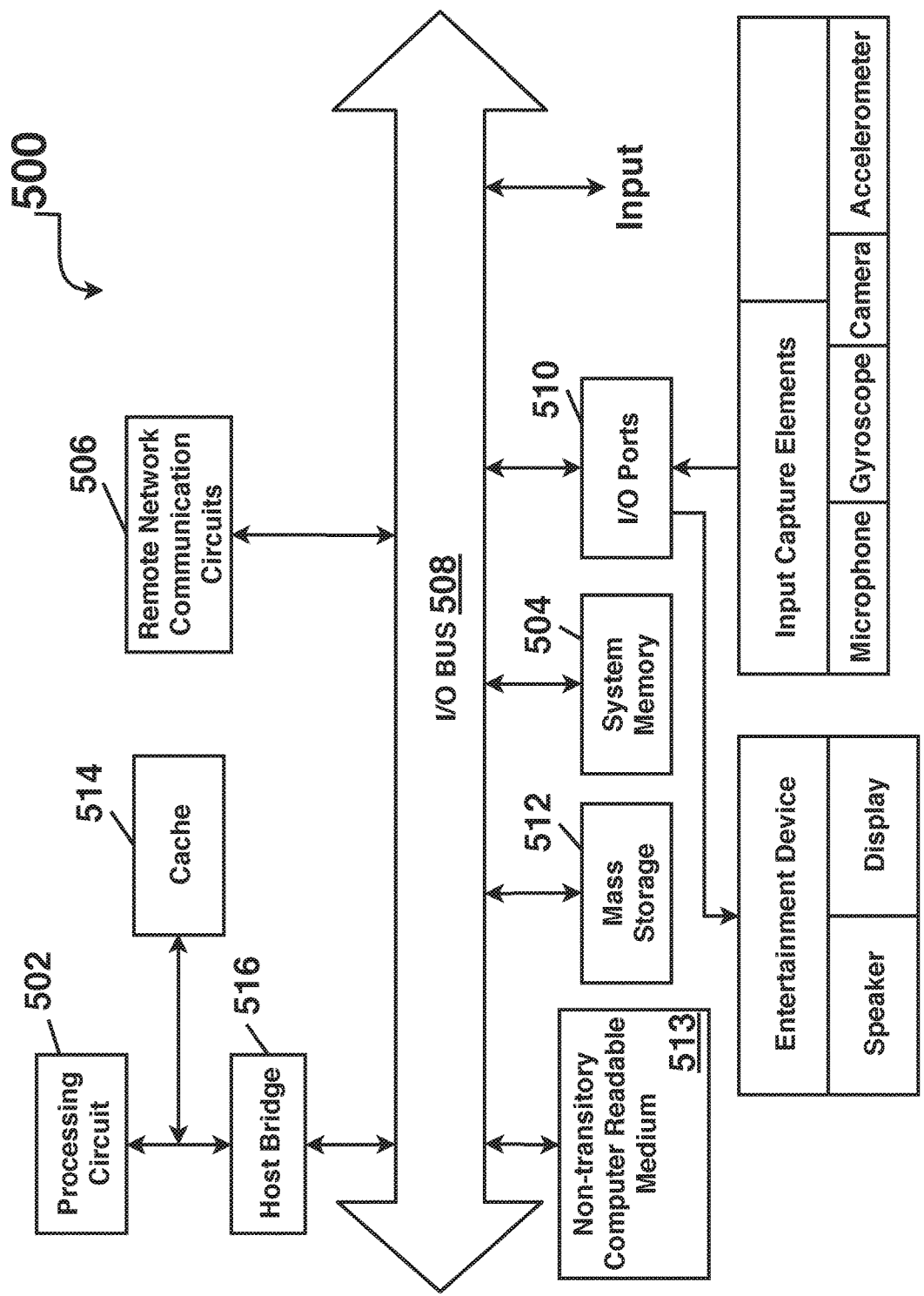
FIG. 5 is a block diagram of an exemplary device of FIG. 1 in which the system operates.

FIG. 5 shows an exemplary computing platform and hardware architecture for patient-side device 101 with similar elements found on therapist-side device 110. In one implementation, patient-side device 101 comprise a system 500 including a processor 502, a system memory 504, remote network communication circuits 506 and one or more software applications and drivers enabling the functions described herein. The hardware system 500 includes a standard I/O bus 508 with I/O Ports 510 and mass storage 512 coupled thereto. Host bridge 516 couples processor 502 to I/O bus 508. The hardware system may further include video memory (not shown) and a display device coupled to the video memory. Collectively, these elements are intended to represent a broad category of computer hardware systems, including but not limited to general purpose computer systems based on the Pentium processor manufactured by Intel Corporation of Santa Clara, Calif., as well as any other suitable processor.

Elements of computer hardware system 500 perform their conventional functions known in the art. In particular, remote network communication circuits 506 are used to provide communication between system 500 and any of a wide range of networks, such as an Ethernet (e.g., IEEE 802.3) network, etc. Mass storage 512 is used to provide permanent storage for the data and programming instructions to perform the above described functions implemented in patient-side device 101, whereas system memory 504 (e.g., DRAM) is used to provide temporary storage for the data and programming instructions when executed by processor 502. I/O ports 510 are one or more serial and/or parallel communication ports used to provide communication between additional peripheral devices, which may be coupled to hardware system 500.

Hardware system 500 may include a variety of system architectures, and various components of hardware system 500 may be rearranged. For example, cache 514 may be on-chip with processor 502. Alternatively, cache 514 and processor 502 may be packed together as a "processor module" or processing circuitry 104 with processor 502 being referred to as the "processor core." Furthermore, certain implementations of the claimed embodiments may not require nor include all of the above components. For example, additional components may be included in system 500, such as additional processors, storage devices, or memories.

As discussed above, in one embodiment, the operations of patient-side device 101 described herein are implemented as a series of software routines run by hardware system 500. These software routines comprise a plurality or series of instructions to be executed by a processor in a hardware system, such as in processor 502 or processing circuitry 104. Initially, the series of instructions are stored on a storage device, such as mass storage 512. However, the series of instructions can be stored on any a non-transitory computer readable medium, such as a diskette, CD-ROM, ROM, etc. Furthermore, the series of instructions need not be stored locally, and could be received from a remote storage device, such as a server on a network, via network/communication interfaces 506. The instructions are copied from the storage device, such as mass storage 512, into memory 504 and then accessed and executed by processor 502. Other implementations are possible. For example, some or all of the functionality described herein can be embodied in firmware or hardware components, such as application specific integrated circuits, and the like.

An operating system manages and controls the operation of system 500, including the input and output of data to and from software applications (not shown). The operating system provides an interface between the software applications being executed on the system and the hardware components of the system. According to one embodiment of the claimed embodiments, the operating system is the LINUX operating system. However, the claimed embodiments may be used with other conventional operating systems, such as the Windows 10 operating system, available from Microsoft Corporation of Redmond, Wash. Apple IOS Operating System, available from Apple Computer Inc. of Cupertino, Calif., Android OS available from Alphabet (fka Google), UNIX operating systems, and the like. Of course, other implementations are possible.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

We claim:

1. A system for remote administration of discrete trial training exercises to a patient and analyzing results, the system comprising:

a patient-side device comprising speakers or display circuitry to provide audio or visual entertainment from existing applications operating thereon, processing circuitry, remote network communication circuitry, and at least one input capture element in communication with the processing circuitry;

a therapist-side device comprising processing circuitry, remote network communication circuitry, and a non-transitory computer readable medium having instructions stored thereon;

wherein the therapist-side device sends via the remote network communication circuitry a plurality of discrete trial training exercises to the patient-side device and inter-trial interval parameters comprising time between administering successive discrete trial training exercises of the plurality of discrete trial training exercises;

wherein instructions which are only executed by the processing circuitry of the patient-side device when the existing applications are currently providing audio or visual entertainment to the patient cause the processing circuitry to:

interrupt operation of the existing applications operating thereon by interrupting the operation of the speakers or display circuitry to administer one of the discrete trial training exercise from the plurality of discrete trail training exercises to the patient which are distinct from the existing applications;

collect via the at least one input capture element a sensor data which includes one chosen from image data, audio data, and motion data; and transmit via the remote network communication circuitry the sensor data to the therapist-side device; and wherein the instructions when executed by the processing circuitry of the therapist-side device cause the processing circuitry to analyze the sensor data and compare the sensor data to a pre-determined result and if the sensor data substantially matches the pre-determined result send via the remote network communication circuitry an immediate reward command to the patient-side device that causes a resumption of the operation of the existing applications and the speakers or display circuitry on the patient-side device and the processing circuitry of the patient-side device executes the inter-trial interval parameters to determine the time between administering successive discrete trial training exercises of the plurality of discrete trial training exercises and when a pre-determined amount of time elapses the processing circuitry interrupts operation of the existing applications operating thereon by interrupting the operation of the speakers or display circuitry to administer another one of the discrete trail training exercise from the plurality of discrete trail training exercises to the patient which are distinct from the existing applications;

and wherein if the sensor data does not substantially match the pre-determined result, send via the remote network communication circuitry a consequence command to the patient-side device that causes the resumption of the operation of the speakers or display circuitry on the patient-side device after a pre-determined delay.

2. The system of claim 1, wherein the therapist-side device sends via the remote network communication circuitry another discrete trial training exercise to the patient-side device in response to the sensor data substantially matching the pre-determined result.

3. The system of claim 1, wherein the instructions when executed by the processing circuitry of the patient-side device cause the processing circuitry to provide instructional commands that relate to the administration of the discrete trial training exercise to the patient.

4. The system of claim 1, wherein the at least one input capture element comprises one or more chosen from a microphone, a camera, a gyroscope, and an accelerometer.

5. A method for remote administration of discrete trial training exercises to a patient and analyzing results, the method comprising:
    providing to the patient a patient-side device comprising speakers or display circuitry to provide audio or visual entertainment from existing applications operating thereon, processing circuitry, remote network communication circuitry, and a non-transitory computer readable medium having instructions stored thereon, and at least one input capture elements in communication with the processing circuitry;
    interrupting operation of the existing applications operating thereon when the existing applications are currently providing audio or visual entertainment to the patient by interrupting the operation of the speakers or display circuitry to administer the discrete trial training exercise to the patient;
    collecting via the at least one input capture elements sensor data which includes one chosen from image data, audio data, and motion data;
    analyzing the sensor data and comparing the sensor data to a pre-determined result;
    determining whether the sensor data substantially matches the pre-determined result; and
    upon a determination that the sensor data substantially matches the pre-determined result, rewarding the patient by causing a resumption of the operation of the existing applications and the speakers or display circuitry on the patient-side device.

6. The method of claim 5, upon a determination that the sensor data does not substantially match the pre-determined result, delaying for a pre-determined amount of time the resumption of the operation of the speakers or display circuitry on the patient-side data.

7. The method of claim 5, and further comprising providing: a therapist-side device comprising processing circuitry, remote network communication circuitry; transmitting via the remote network communication circuitry a sensor data collected from the at least one sensor to the therapist-side device; and analyzing the sensor data and comparing the sensor data to a pre-determined result on the therapist-side device.

8. The method of claim 7, sending via the remote network communication circuitry a plurality of discrete trial training exercises to the patient-side data collection device from the therapist-side device from which the processing circuitry on the patient-side device selects one discrete trial training exercise from the plurality of discrete trial training exercises.

9. The method of claim 5, and further comprising providing instructional commands to the patient-side device that relate to the administration of the discrete trial training exercise to the patient.

10. The method of claim 5, wherein the patient-side device is a mobile device, and wherein the speakers or display circuitry comprises speakers for providing audio information and a display for providing visual information, and wherein the input capture elements comprise one or more chosen from a microphone, a camera, a gyroscope, and an accelerometer.

11. A system for remote administration of discrete trial training (DTT) exercises to a patient and analyzing results, the system comprising:
    a therapist-side device comprising remote network communication circuitry for transmitting a plurality of DTT exercises and inter-trial interval parameters comprising time between administering successive DTT exercises of the plurality of DTT exercises;
    a database remotely connected to the therapist-side device for receiving the plurality of DTT exercises and inter-trial interval parameters comprising time between administering successive DTT exercises of the plurality of DTT exercises;
    a patient-side device comprising remote network communication circuitry for receiving from the database one of a plurality of DTT exercises at a time and further comprising speakers or display circuitry to provide audio or visual entertainment from existing applications operating thereon to the patient, processing circuitry, at least one input capture element in communication with the processing circuitry; and a non-transitory computer readable medium having instructions stored thereon; and the remote network communication circuitry for communicating with the database;
    wherein the instructions which are only executed by the processing circuitry of the patient-side device when the existing applications are currently providing audio or visual entertainment to the patient cause the processing circuitry to:
    request and receive from the database one of a plurality of DTT exercises;
    interrupt operation of the existing applications operating thereon by interrupting the operation of the speakers or display circuitry to administer the discrete trial training exercise to the patient;
    collect via the at least one input capture element a sensor data which includes one chosen from image data, audio data, and motion data; and
    transmit the sensor data to the database;
    wherein the database comprises instructions to:
    analyze the sensor data; and
    compare the sensor data to a pre-determined result, and
    if the sensor data substantially matches the pre-determined result, send a reward command from the database over the network in real time to the patient-side device that causes and immediate resumption of the operation of the existing applications and the speakers or display circuitry on the patient-side device,
    wherein the processing circuitry of the patient-side device executes an inter-trial interval parameters to determine a time between administering successive DTT exercises of the plurality of DTT exercises and when a pre-determined amount of time elapses the processing circuitry requests and receives from the database remote to the patient-side device in real time a second DTT exercise instruction to present to the patient via the speakers or display circuitry on the patient-side device to execute another one of the DTT exercises from the plurality of DTT exercises stored in the database;

transmit the sensor data from the second DTT exercise to the database over the network;

wherein the database comprises instructions to:

analyze the sensor data from the second DTT exercise; and compare the sensor data from the second DTT exercise to a pre-determined result, and if the sensor data from the second DTT exercise matches the pre-determined result, send a reward command from the database over the network in real time to the patient-side device that causes an immediate resumption of the operation of the existing applications and the speakers or display circuitry on the patient-side device, and if the if the sensor data from the second DTT exercise does not substantially math the pre-determined result, send via network a consequence command to the patient-side device that causes the resumption of the operation of the speakers or display circuitry on the patient-side device after the pre-determined amount of time elapses.

12. The system of claim 11, wherein the instructions when executed by the processing circuitry of the patient-side device cause the processing circuitry to provide instructional commands that relate to the administration of the discrete trial training exercise to the patient.

13. The system of claim 11, wherein the at least one input capture element comprises one or more chosen from a microphone, a camera, a gyroscope, and an accelerometer.

14. The system of claim 11, and further comprising the therapist-side device and wherein the sensor data is transmitted to the therapist-side device, wherein instructions when executed by a processing circuitry of the therapist-side device cause the processing circuitry of the therapist-side device to analyze the sensor data and compare the sensor data to a pre-determined result and if the sensor data substantially matches the pre-determined result send via the remote network communication circuitry the reward command to the patient-side device that causes a resumption of the operation of the speakers or display circuitry on the patient-side device.

15. The system of claim 11, wherein if the sensor data does not substantially match the pre-determined result, a consequence command causes the resumption of the operation of the speakers or display circuitry on the patient-side device after a pre-determined delay.

* * * * *